(12) United States Patent
Mueller et al.

(10) Patent No.: US 9,287,063 B2
(45) Date of Patent: Mar. 15, 2016

(54) BICYCLE HANDLE SYSTEM

(71) Applicant: RTI Sports Vertrieb von Sportartikeln GmbH, Koblenz (DE)

(72) Inventors: Michael Mueller, Siershahn (DE); Andreas Krause, Koblenz (DE)

(73) Assignee: RTI Sports Vertrieb Von Sportartikeln GMBH, Koblenz (DE)

(*) Notice: Subject to any disclaimer, the term of this patent is extended or adjusted under 35 U.S.C. 154(b) by 76 days.

(21) Appl. No.: 14/212,071

(22) Filed: Mar. 14, 2014

(65) Prior Publication Data
US 2014/0260753 A1    Sep. 18, 2014

(30) Foreign Application Priority Data
Mar. 15, 2013  (DE) .................. 20 2013 002 491 U

(51) Int. Cl.
| H01H 3/00 | (2006.01) |
| B62M 6/45 | (2010.01) |
| B62K 23/04 | (2006.01) |

(52) U.S. Cl.
CPC .............. *H01H 3/00* (2013.01); *B62K 23/04* (2013.01); *B62M 6/45* (2013.01); *Y10T 74/20256* (2015.01)

(58) Field of Classification Search
CPC ................................ H01H 3/00; B62M 25/08
USPC .................. 200/5 R, 61.85, 61.88; 74/484 R
See application file for complete search history.

(56) References Cited

U.S. PATENT DOCUMENTS

| 4,356,358 | A | * | 10/1982 | Fukukura ................. 200/5 A |
| 5,577,969 | A | | 11/1996 | Watarai |
| 6,031,190 | A | | 2/2000 | Tokuda et al. |
| 6,144,125 | A | | 11/2000 | Birkestrand et al. |
| 7,841,255 | B2 | | 11/2010 | Fujii |
| 2005/0023067 | A1 | | 2/2005 | Ledford et al. |
| 2010/0212978 | A1 | | 8/2010 | Huang |
| 2010/0270135 | A1 | * | 10/2010 | Murasawa et al. ......... 200/61.88 |
| 2011/0303041 | A1 | * | 12/2011 | Cheng et al. .................... 74/488 |

FOREIGN PATENT DOCUMENTS

| DE | 10143585 | * | 3/2003 |
| DE | 10143585 A1 | | 3/2003 |
| DE | 102012204189 A1 | | 9/2012 |
| DE | 202012104005 U1 | | 12/2012 |
| EP | 1225123 A1 | | 7/2002 |
| EP | 1630095 A2 | | 3/2006 |
| EP | 2052960 A2 | | 4/2009 |
| WO | 03024773 A1 | | 3/2003 |
| WO | 2005021366 A1 | | 3/2005 |

* cited by examiner

*Primary Examiner* — Edwin A. Leon
*Assistant Examiner* — Iman Malakooti
(74) *Attorney, Agent, or Firm* — Ohlandt, Greeley, Ruggiero & Perle, L.L.P.

(57) ABSTRACT

A bicycle handlebar system comprises a control element for controlling an electric auxiliary motor, said element being adapted to be fastened to the handlebar. The control element has a housing, wherein a plurality of switching elements is arranged in recesses in the housing, one membrane button is arranged in the housing per switching element, the switching element acting on said membrane button, and the membrane buttons are interconnected through a common flexibly conductor path.

14 Claims, 2 Drawing Sheets

BICYCLE HANDLE SYSTEM

CROSS REFERENCE TO RELATED APPLICATIONS

The present disclosure claims the priority of German Utility Model Application no. DE 20 2013 002 491.7 filed on Mar. 15, 2013, the disclosures of which are incorporated herein by reference.

BACKGROUND

1. Field of the Disclosure

The disclosure relates to a bicycle handle system for fastening to a bicycle handlebar.

2. Description of the Prior Art

The handlebars of electrically assisted bicycles are provided with control elements for controlling the electric motor. These control elements are fastened on the handlebar by clamping, for example. Since these are control elements that are independent of the handle, they can be mounted on the handlebar laterally next to the conventional bicycle handle. Such control elements have the disadvantage that their operation often requires taking a hand from a bicycle handle. It is necessary to at least partially release the handle, for instance, in order to actuate a switch on the control element with the thumb. This means a reduction in safety, since, for example, when riding over a bump or the like there is a risk of the hand slipping from the handle. Moreover, the ergonomics of such control elements is not or only slightly adapted to the posture of the hand of a user while riding on a bicycle. Further, known control elements are disadvantageous in that they a rather wide and therefore require much space on the handlebar. This is disadvantageous given the great number of other elements arranged on a bicycle handlebar.

SUMMARY

It is an object of the disclosure to provide a bicycle handle system, in which a control element having at least one electric switch for controlling an electric auxiliary motor can be actuated in a simple manner and preferably requires little structural space.

The bicycle handle system of the disclosure comprises a handle element adapted to be mounted to or on a bicycle handlebar. According to the disclosure, a control element for controlling electric auxiliary motor of the bicycle is provided in particular laterally next to the handle element that may be slightly shorter than conventional handles, if need be. In the mounted state, the control element is preferably arranged within the handle element so that it is preferably possible to actuate the control element in particular with the thumb without having to release the hand from the handle element. The control element allows changing the assisting power of the auxiliary motor. The control element has a housing with a plurality of switching elements in a plurality of recesses. Besides switching elements for changing the assisting power of the auxiliary motor, the switching elements may include for instance a main switch, a light switch and a mode switch with which the display on a bicycle computer can be changed. The switching elements act on membrane buttons arranged inside the housing. For this purpose, a respective membrane button is provided in the housing for each switching element. An actuation of the switching element, i.e. pressing the switching element into the housing, thus causes the actuation of a membrane button. According to the disclosure, the membrane buttons are interconnected through a common flexible conductor path.

When acted upon by a switching element, the membrane buttons cause an electric contact. In a preferred embodiment, the membrane buttons are designed such that they are respectively protrusions that are respectively deformed or pressed inward by the switching element and make the electric contact. When the switching element is released, the elastically deformed membrane button returns to its initial position or its initial shape so that the electric contact is interrupted again. Preferably, the membrane button may be designed as a protrusion, e.g. a spherical protrusion. Providing membrane buttons interconnected through a common conductor path has the advantage that it is possible to realize a control element requiring little structural space.

In this context, it is particularly preferred that at least three of the switching elements of the control element are arranged one after the other in the circumferential direction. In the mounted state, the control element surrounds the handlebar at least partially so that the switching elements are arranged in the circumferential direction in an upper side of the control element averted from the handlebar. Specifically, the switching elements are arranged on the upper side of the control element in the region that is directed upward towards the user. Such regions can be accessed well by the thumb or the index finger, even without taking the hand off the handle. In particular, all switching elements provided on the control element are correspondingly arranged one after the other in the circumferential direction.

Further, it is preferred that at least three membrane buttons are arranged one after the other in the longitudinal direction along a strip-shaped conductor path. In the mounted state, the conductor path is in particular rectangular so that membrane buttons can be arranged one after the other in the longitudinal direction on the conductor path. Thereby, the structural space can be reduced significantly. In this regard, it is particularly preferred that all membrane buttons are arranged one after the other in the longitudinal direction along a strip-shaped conductor path. In order to achieve a design of the switching elements that is as simple as possible, it is particularly preferred that the switching elements correspondingly arranged one after the other in the circumferential direction of the control element, cooperate with membrane buttons arranged immediately below them in the housing, the membrane buttons being arranged one after the other on a single strip-shaped conductor path.

Inside the housing, retaining elements, such as retaining pins, are preferably provided. These serve the fixation of the conductor path and in particular the positional fixation of the membrane buttons in the housing. In this regard, it is possible to place the conductor path about in particular cylindrical pins, it being preferred that one membrane button is arranged between two pins. Thus, according to the disclosure, at least some of the pins are preferably arranged such that a membrane button is arranged between them. In this case, the pins serve for positional fixation and as an abutment for the membrane buttons.

It is an advantage of the use of conductor paths with integrated membrane buttons that these are water-proof and that, in particular, no short-circuit can occur when water enters the control element. In a preferred embodiment of the disclosure, a connector board connects the conductor path with a wire leading out of the housing. The connector board, which is a six pin FFC connector, for instance, may be potted to prevent water from entering there as well. Instead of providing a connector board, the switching data can also be transmitted in a wireless manner to a receiver integrated, for example, in the bicycle computer or the motor. For this purpose, the conductor path is connected with a transmitter unit or, possibly, a transceiver unit. The same may preferably provided within the control element.

Preferably, the control element comprises an actuation element. The actuation element is rotatably connected with a bearing element. For example, the bearing element can be sleeve-shaped or have a sleeve-shaped extension and be fixed on the bicycle handlebar either directly or indirectly. Thereby, the actuation element can be rotated on the bearing element. A rotation of the actuation element relative to the bearing element causes an actuation of the electric switching element that preferably comprises at least one membrane button.

According to the disclosure, this is achieved in a first, particularly preferred embodiment a switching tab is provided on the actuation element. By turning the actuation element relative to the bearing element, the at least one switching tab acts on the at least one electric membrane button. The same principle of the present disclosure can be realized by arranging the at least one switching tab on the bearing element or in particular on the fixing element fastened on the handlebar, and by providing the at least one electric membrane button, on which the at least one switching element acts, on the actuation element. What is of relevance is the relative movement between the at least one switching tab and the corresponding at least one membrane button, the switching being effected by simply turning the actuation element through a predetermined angle or by pivoting the actuation element so that the electric auxiliary motor can be controlled with respect to the assisting power.

In this regard, it is preferred that the actuation element can be turned in two different directions on the bearing element and that the assisting power from the auxiliary motor is thereby reduced or increased. Preferably, two membrane buttons are provided for this purpose, one of the buttons serving to increase the assisting power and the other button serving to reduce the same. Both membrane buttons can be acted upon by one switching tab or by two separate switching tabs.

The fixing element, which in an alternative embodiment is connected with the at least one switching tab, can have additional functions. For example, the fixing element may be designed as a clamping element and serve to fix the bearing element on the handlebar.

In a particularly preferred development of the disclosure, the actuation element comprises a sliding element arranged for rotation on the bearing element. In this embodiment, the sliding element forms a plain bearing together with the bearing element. As an alternative, rolling elements, such as balls, can be provided between these two elements. It is particularly preferred that the bearing element has a cylindrical inner diameter that substantially corresponds to the outer diameter of the bicycle handlebar so that the bearing element can be fixed on the bicycle handlebar in a simple manner, for example by means of a clamping means such as a clip or the like. The fixation of the bearing element can also be achieved through a connection with the handle element which in this case will be fixed on the bicycle handlebar. A preferred embodiment of the outer surface of the bearing element forming the siding surface is preferably also shaped substantially cylindrically. Correspondingly, it also preferred that the sliding element has a substantially cylindrical inner surface directed towards the bearing element. In this regard, it is preferred that the sliding element is formed integrally with the control element, in particular as an injection molded part.

In another preferred embodiment, the at least one switching tab is connected with the bearing element or the fixing element and protrudes into the actuation element. In this context, it is further preferred that a side wall of the actuation element comprises at least one slit-shaped opening through which the at least one switching tab protrudes. If at least two switching tabs are provided, it is preferred to provide one slit-shaped opening for each switching tab. In this preferred embodiment the actuation element can be hollow in the manner of a housing so that the at least one switching tab is arranged between an outer wall of the housing and the sliding element. Thereby, a compact structure can be achieved.

In order to achieve the simplest possible actuation of the control element, in particular a simple turning of the actuation element on the bearing element, the actuation element comprises a switching depression. In the mounted state, the latter is directed in particular in the direction of the user so that it is possible, in a simple manner, to actuate the control element with the thumb via the corresponding switching depression without having to take the hand off the bicycle handle. In particular, it is preferred that the at least one switching tab is arranged substantially opposite the switching depression. Especially in the embodiment in which the switching tab is connected with the bearing element or the fixing element, this has the advantage that no space must be provided for the at least one switching tab in the area of the switching depression. Thus, the control element can be of an ergonomic and compact design in the area of the switching depression. In a preferred embodiment, there is ample space in the portion of the control element averted from the user. Instead of a switching depression, it is possible to provide a switching protrusion, for instance, which is directed in particular towards the user and can be actuated n particular with the thumb.

BRIEF DESCRIPTION OF THE DRAWINGS

A full and enabling disclosure of the present disclosure, enabling one of ordinary skill in the art to carry out the disclosure, is set forth in greater detail in the following description, including reference to the accompanying drawing in which.

DESCRIPTION OF THE PREFERRED EMBODIMENTS

Figure 1:
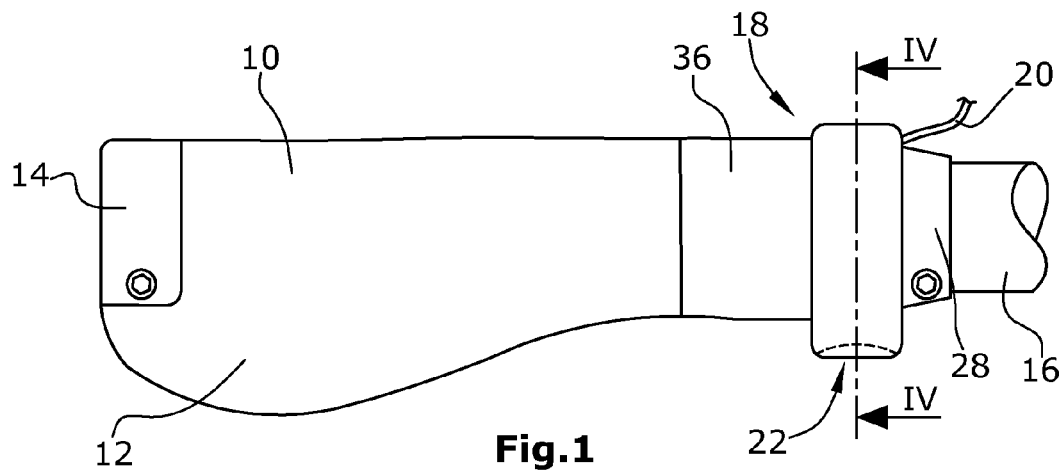
FIG. 1 is a schematical top plan view of a bicycle handlebar together with a control element.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the disclosure to the particular form disclosed, but are merely illustrative and intended to teach one of ordinary skill how to make and/or use the disclosure claimed herein.

In a preferred embodiment of the bicycle handle system of the present disclosure a handle element 10 is provided. The handle element 10 has a protrusion 12 for supporting the palm of the hand and is fastened on the bicycle handle bar by a clamping means 14. Such a handle element is described in EP 1 537 014, for example. The handle element is guided on the handlebar by means of the clamping means 14. An actuation element 18 is arranged on a side that is the inner side with respect to the handle element 10. The actuation element 18 is at least partially pivotable or rotatable about the handlebar 16. Thereby, an electric switch is actuated that controls an auxiliary motor connected with the control element via a wire 20. The connection may also be wireless. In the embodiment illustrated, the actuation element 18 is turned by means of a thumb placed in a switching depression 22 of the actuation element and by moving the thumb upward or downward.

Figure 2:
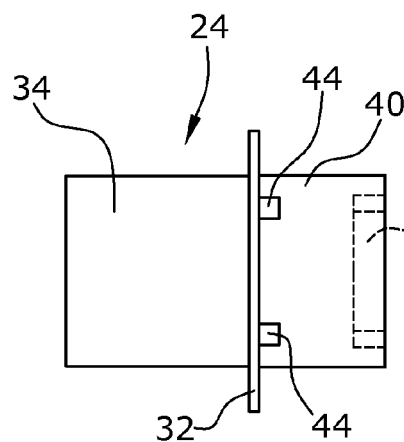
FIG. 2 is a schematic top plan view of the bearing element.
Figure 3:
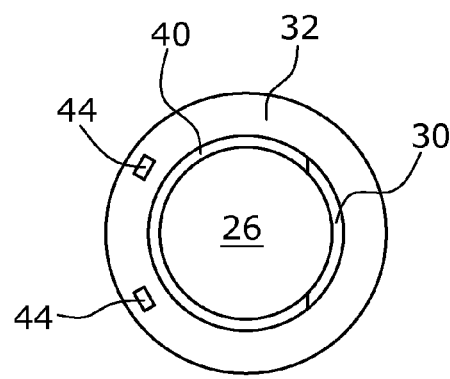
FIG. 3 is a schematic side elevational view of the bearing element in the direction of the arrow III in FIG. 2.
Figure 4:
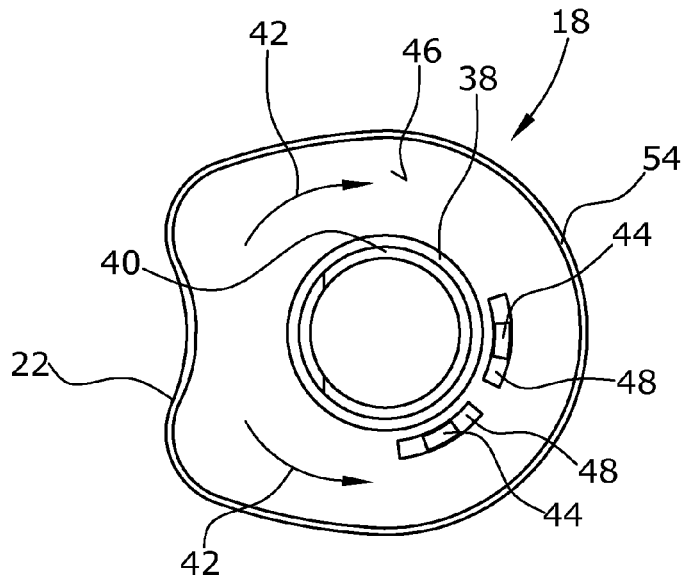
FIG. 4 is a schematic sectional view of the control element and the bearing element along line IV-IV in FIG. 1.

The actuation element 18 is arranged on a bearing element 24 (FIG. 2). The bearing element 24 has a cylindrical opening 26 (FIG. 3) having the outer diameter of the handlebar 16. By means of a fixing element 28 (FIG. 1) in the form of a clamp in cooperation with a recess 30 in the bearing element, the bearing ring can be fixed on the handlebar 16. The actuation element 18 is arranged on the right or inner side of an annular abutment ring 32, as illustrated in FIG. 2. An opposite cylindrical part 34 of the bearing element 24 either protrudes directly into the handle element 10 or is partially surrounded by another, substantially cylindrical handle part 36 so that the cylindrical extension 34 protrudes only partially into the handle element 10. For example, other electronic components or the like can be housed in the cylindrical handle part 36.

In the embodiment illustrated the actuation element 18 comprises an inner cylindrical extension 38 forming a sliding element. The same surrounds the cylindrical extension 40 of the bearing element 24 so that it is possible to turn or pivot the control element on the cylindrical extension 40 of the bearing element 23 as indicated by the arrows 42. In the embodiment illustrated, the actuation element 18 is actuated using the thumb placed in the depression 22.

In the embodiment illustrated, the circular abutment ring 32 of the bearing element 24 is provided with two switching tabs 44 extending into the actuation element 18. For this purpose, a side wall 46 of the actuation element 18 is provided with slots 48.

Figure 5:
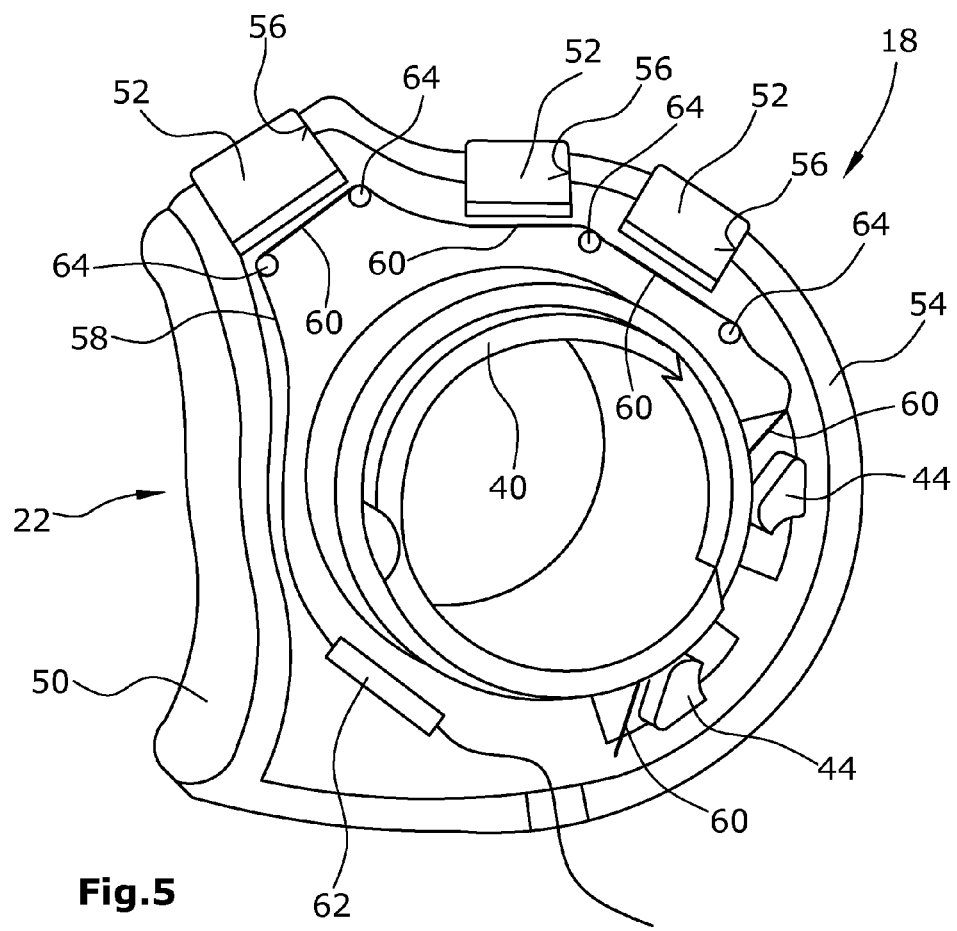
FIG. 5 is a schematic sectional view of the control element and the bearing element along line IV-IV in FIG. 1.

In the area forming the switching depression 22, a switching element 50 (FIG. 5) is arranged that is made of a softer plastic material, for instance. Further switching elements 52 are arranged in the circumferential direction along the outer side of a housing 54 forming the actuation element 18. The switching elements 52 are arranged in various recesses 56 in the housing 54 and can be pushed inward for switching. The switching elements 52 are configured, for example, as a main switch, a light switch and a mode switch for the control of a bicycle computer.

Figure 6:
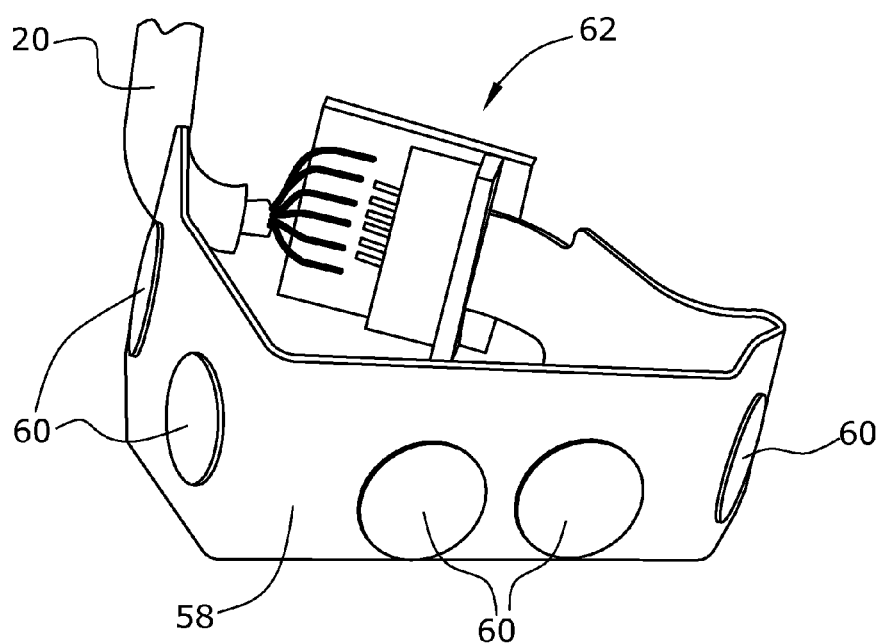
FIG. 6 is a schematic perspective illustration of a conductor path with integrated membrane buttons.

Inside the housing 54, a plurality of membrane buttons 60 is provided that are interconnected by a conductor path 58. In particular, the membrane buttons 60 are integrated into the conductor path 58, as is seen best in FIG. 6. Corresponding to the switching elements 52, the conductor path 58, together with the membrane buttons 60, extends in the circumferential direction of the housing 54. Two membrane buttons 60 are also arranged in the area opposite the switching depression 22, the switching tabs 44 acting on these buttons when the actuation element 18 is turned.

The conductor path 58 with the integrated membrane buttons 60 is strip-shaped so that all membrane buttons 60 are arranged one behind the other in the longitudinal direction. The conductor path 58 is connected with a connector board 62 which, in a preferred embodiment, is connected with the wire 20 by a six-pin plug. The conductor path is placed into the housing 54, with the individual membrane buttons 60 being fixed by pins 64 that are in particular formed integrally with the housing. By pushing a switching element 52 so designed, the membrane button correspondingly arranged in the housing under the switching element 52 is actuated and a corresponding electric signal is generated or an electric contact is made.

Turning the actuation element 18 causes a turning of the conductor path 58 connected with the actuation element 18. Thereby, one of the two membrane buttons 60 gets into contact with one of the two switching tabs 44, the switching tabs 44 being stationary because of their connection with the bearing element 24. Thereby, an electric contact can be established and a corresponding switching signal can be generated.

All references cited herein are incorporated by reference to the full extent to which the incorporation is not inconsistent with the express teachings herein.

Although the disclosure has been described and illustrated with reference to specific illustrative embodiments thereof, it is not intended that the disclosure be limited to those illustrative embodiments. Those skilled in the art will recognize that variations and modifications can be made without departing from the true scope of the disclosure as defined by the claims that follow. It is therefore intended to include within the disclosure all such variations and modifications as fall within the scope of the appended claims and equivalents thereof.

What is claimed is:

1. A bicycle handle system comprising:
a control element for controlling an electric auxiliary motor, said control element being adapted to be fastened on a bicycle handlebar next to a handle element,
wherein
the control element comprises a housing, a plurality of switching elements being arranged in recesses in the housing,
one membrane button is arranged inside the housing for each switching element, the switching element acting on the membrane button,
the membrane buttons are interconnected via a common flexible conductor path,
the control element comprising an actuation element being rotatable on a bearing element, and
the housing forming the actuation element.

2. The bicycle handle system of claim 1, wherein at least three, in particular all switching elements of the control element are arranged one behind the other in the circumferential direction.

3. The bicycle handle system of claim 1, wherein at least three, in particular all membrane buttons are arranged one behind the other in the longitudinal direction on the in particular strip-shaped conductor path.

4. The bicycle handle system of claim 1, wherein retaining elements, in particular retaining pins, are provided in the housing for fixing the conductor path, in particular for the positional fixation of the membrane buttons.

5. The bicycle handle system of claim 1, wherein a plug board connects the conductor path with a wire leading out of the housing.

6. The bicycle handle system of claim 1, wherein at least one switching tab is provided at the actuation element, the bearing element or a fixing element adapted to be fastened to the handlebar, the at least one switching tab acting on a membrane button when the actuation element is turned relative to the bearing element.

7. The bicycle handle system of claim 6, wherein the actuation element surrounds the in particular cylindrical bearing element and comprises an in particular cylindrical sliding element rotatable on the bearing element.

8. The bicycle handle system of claim 6, wherein the at least one switching tab is connected with the bearing element or the fixing element and protrudes into the actuation element.

9. The bicycle handle system of claim 7, wherein the membrane buttons are arranged radially between the sliding element and an outer wall of the actuation element.

10. The bicycle handle system of claim 6, wherein the actuation element comprises a switching depression for rotation relative to the bearing element.

11. The bicycle handle system of claim 10, wherein the at least one switching tab is arranged substantially opposite the switching depression.

12. A bicycle handle system comprising:
a control element for controlling an electric auxiliary motor, said control element being adapted to be fastened on a bicycle handlebar next to a handle element,
wherein
said control element comprises a housing, a plurality of switching elements being arranged in recesses in said housing,
one membrane button is arranged inside said housing for each of said plurality of switching elements, said switching element acting on said membrane button, and
said membrane buttons being interconnected via a common flexible conductor path wherein said control element comprises an actuation element rotatable on a bearing element, and that at least one switching tab is provided at said actuation element, said bearing element or a fixing element adapted to be fastened to said bicycle handlebar, said at least one switching tab acting on a membrane button when said actuation element is turned relative to said bearing element, wherein said at least one switching tab is connected with said bearing element or said fixing element and protrudes into said actuation element.

13. A bicycle handle system comprising:
a control element for controlling an electric auxiliary motor, said control element being adapted to be fastened on a bicycle handlebar next to a handle element,
wherein
said control element comprises a housing, a plurality of switching elements being arranged in recesses in said housing,
one membrane button is arranged inside said housing for each of said plurality of switching elements, said switching element acting on said membrane button, and
said membrane buttons being interconnected via a common flexible conductor path
wherein said control element comprises an actuation element rotatable on a bearing element, and that at least one switching tab is provided at said actuation element, said bearing element or a fixing element adapted to be fastened to said bicycle handlebar, said at least one switching tab acting on a membrane button when said actuation element is turned relative to said bearing element, wherein the actuation element comprises a switching depression for rotation relative to the bearing element.

14. The bicycle handle system of claim 13, wherein said at least one switching tab is arranged substantially opposite said switching depression.

\* \* \* \* \*